Patented June 28, 1938

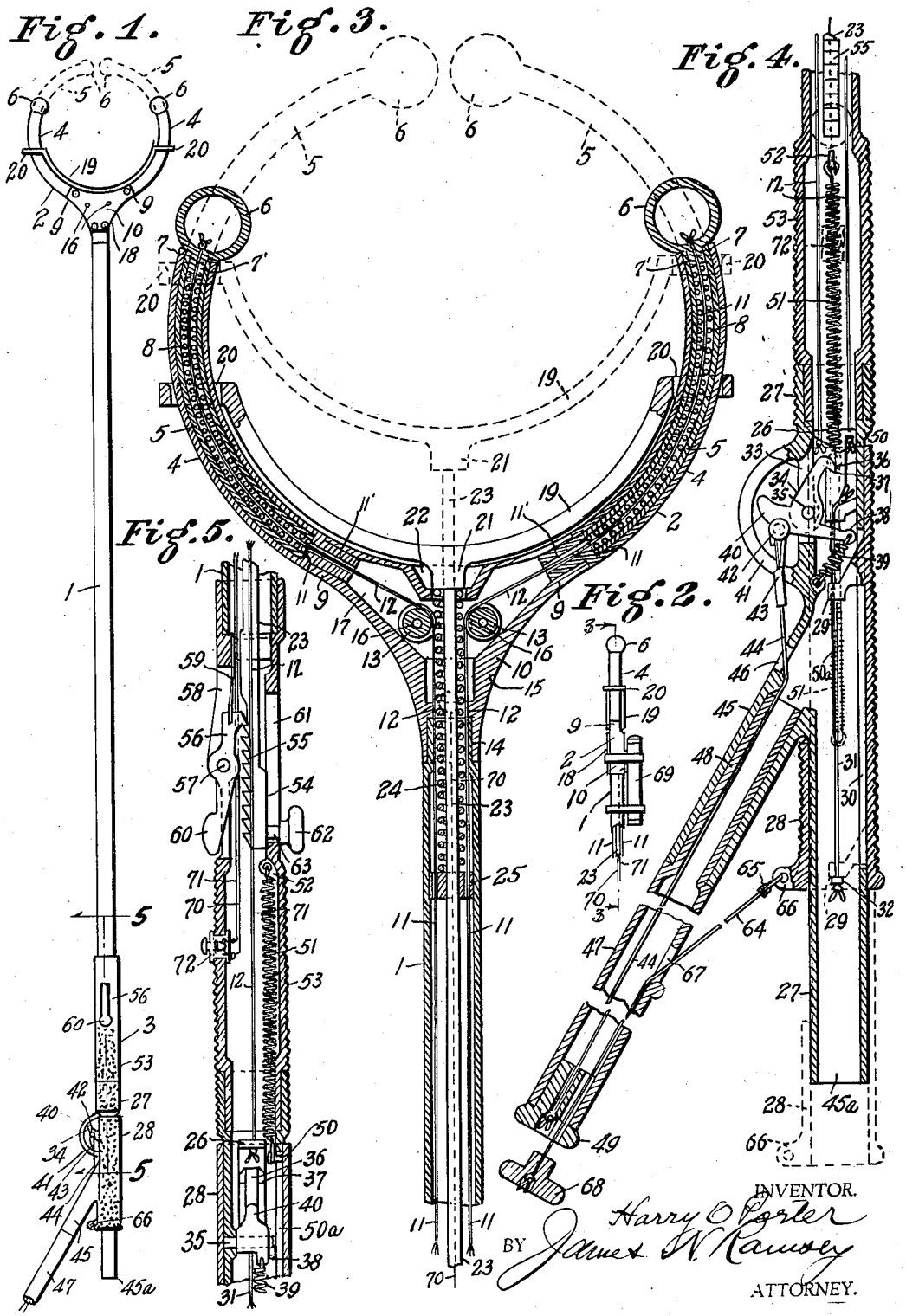

2,122,264

UNITED STATES PATENT OFFICE 2,122,264

NOOSE DEVICE

Harry O. Porter, Anderson Township, Hamilton County, Ohio

Application June 11, 1937, Serial No. 147,604

20 Claims. (Cl. 119—154)

My invention relates to improvements in devices for snaring or catching animals, and more especially to such devices as are adapted for snaring or catching the warier animals such as dogs or cats and the like, either in work of collecting stray animals, or in work of rescuing the animals from perilous positions, as in trees, on cliffs, down in wells or between walls, or from water or fire. Such devices may also be used in obtaining wild animals alive, or even may be used for arresting persons, such as dangerous demented persons. Any of the examples above mentioned are characterized by a high degree of cunning and wariness on the part of the animal or person sought to be snared, or else, in the case of rescue, by adverse conditions, including movements of the animal or person due to fear or fatigue, all of which call for provisions not needed particularly in the care of more docile and less cunning animals, as for instance sheep and the like.

Broadly, the object of my invention is to enable a person, such as those charged with the capture and care of stray animals, viz: humane officers, wardens, policemen, firemen, animal tenders in zoos, circuses and the like, to retentively engage the animal securely around the neck or body while the animal is at a considerable distance from the person operating the device, insuring the capture of the animal yet avoiding injury to it as well as minimizing the danger to the person making the capture, either from the actions of the animal or from falling, drowning or the like in case of rescue work.

Subordinate objects are provision for capturing, with the same device, larger or smaller animals; ready increase of reach of the device when needed; compactness of cross section facilitating use of the device in close places; smoothness of structure avoiding hindrance of insertion of the device into such places as well as avoiding injury of the animal being captured; and lightness in weight minimizing the labor of transportation and use of the device.

Other objects will appear in the course of the following description, illustrated by the accompanying drawing, in which:—

Figure 1 is a plan view of a noose device embodying my invention;

Fig. 2 is a side or edge elevation of the animal-engaging end part of the same, on the same scale;

Fig. 3 is a longitudinal section, on an enlarged scale, of this end part of the device, on the plane of the line 3—3 of Fig. 2;

Fig. 4 is a like section, on the same scale as Fig. 3, of the opposite or manipulating end part of the device; and Fig. 5 is a like section, on the same scale as Figs. 3 and 4, on the plane of the line 5—5 of Fig. 1, which plane is at right angles about the axis of the device to the plane of the sections in Figs. 3 and 4.

Referring to Fig. 1, where the device is shown in full length except that only a small end part of an attached extension is shown, there is seen a long and slender body part 1 with the animal-engaging means 2 at one end and the manipulating and extension-connecting means 3 at its opposite end. This latter mentioned means 3 is held by the operator, who reaches an animal, at a considerable distance by means of the long body part 1, with the engaging means 2 which is constructed with mechanism to open for admittance of the animal and close for its retention, which mechanism is operated by suitable operative connection with the manipulating devices in the end part 3.

As here exemplified, the animal-engaging means 2 is made up of hollow curved fork members 4 rigidly secured to the end of the body part 1, which also is hollow, and curved closure members 5 are slidable inward and outward in the hollow fork members 4, and have on their outer ends ball-like enlarged projections 6 which by their ample smooth surfaces are adapted for avoiding injury to the animal as they pass at opposite sides of its neck or body while the closure members 5 are slid to their inner positions in the respective fork members 4, indicated by solid lines, and as they pass around the neck or body of the animal to their outer closing positions, indicated by dotted lines.

As best seen in Fig. 3, the closure members 5 also are hollow, with the terminal balls 6 fixed by necks 7 inside their outer ends and providing the outer-end-abutments 7' for respective open-coil springs 8 contained within the closure members 5. The hollow fork members 4 which contain and guide these closure members have reduced inner end parts fixed in respective terminal hubs 9 of the junction member 10 and forming abutments 11 for the inner ends of the respective springs 8. Thus, these springs 8 are compressed between the outer and inner abutments when the closure members are moved inward, and tend to force these members outward to closing position unless held by retaining means.

This retaining means comprises slender but strong cables 12 with their outer end parts fixed in the necks of the respective ball terminals 6;

the cables extending inward within the respective coil springs 8 and through openings 11' into the hollow interior of the junction member 10, where they pass around suitable guide and support means, as the rollers 13, and into the interior of the body member 1, which is tubular and has a reduced end part 14 fixed in the middle hub 15 of the junction member 10. The rollers 13 turn on pins 16 mounted in the side walls 17 and 18 (see Fig. 2) of the junction member 10. Preferably, side wall 18 is removably secured to the main portion of junction member 10 by screws seen in Fig. 1, for ease of assembly of the device, and also permitting inspection and repair of the contained parts. The terminal balls 6 are preferably made hollow, for lightness of construction.

The mechanism so far described is suited for snaring the larger animals, such as large dogs for instance, around their bodies, or even larger animals around their necks. For snaring the animals around their necks, of sizes most frequently encountered, and for snaring the smaller animals, as small dogs, cats and the like, around their bodies, greater restriction is needed. In my present example I have provided for this greater restriction by means of an arcuate auxiliary fork member 19 which fits closely along the inner sides of the main fork members 4 when not in use, as indicated by the solid lines; but is adapted to be extended outward in the space between the main members 4 for restriction of the space, as indicated by the dotted lines in Fig. 3. Its outer ends have eyes 20 embracing the respective main fork members 4 so that these ends of the auxiliary fork member are guided by the main members 4 as the auxiliary member moves outward or inward, and are well supported in their outermost positions adjacent to the outer ends of the main members 4. The middle of this auxiliary member 19 has a hub 21 which occupies a socket 22 in the crotch of the junction member 10 and has fixed in it the outer end of a rod 23 which extends into member 10 through an opening in the bottom of the socket 22. This rod 23 extends through the junction member 10 into the interior of the tubular body member 1, and is surrounded by an open coil spring 24 having its outer end part extending out through the opening and abutting the auxiliary member hub 21. The inner end of this spring 24 abuts a hollow plug 25 fixed inside the tubular body member 1 and having openings for passage of the rod 23 and the cables 12. This plug 25 also acts as a guide for the rod 23 to aid in support of the auxiliary fork member 19; and the rod 23 and the guiding opening are preferably of angular cross section, to resist twisting movement of the auxiliary fork member 19.

Referring now more particularly to Figs. 4 and 5, which show the interior details of the manipulating end part 3 of the device, the two cables 12 that connect with the closure members 5 as above described, are seen in Fig. 4 with their ends secured in the head or yoke 26 slidable inside the handle member 27. A sleeve 28 surrounds and is slidable longitudinally along the handle member 27 and has a lug 29 projecting in through a longitudinal slot 30 in the handle member. A single cable 31 is secured in the head or yoke 26 and extends loosely through an opening in the lug 29, past which it has a stop collar 32 secured to its end.

The handle member 27 has a lateral slot 33 occupied by a trigger or latch member 34 with a hub journaled on a pin 35 mounted in the slot walls. This latch member has three arms radiating from its hub. Its arm 36 is hooked to engage in a notch 37 in the adjacent side of the head or yoke 26 whereby the closure members 5, to which the yoke is connected by the cables 12, are held in their inner positions against the pressure of the springs 8. The second arm 38 of the latch member extends inward, being offset to permit passage of the above mentioned cable 31, and is connected to one end of tension spring 39, the opposite end of which is connected to a lug on the interior wall of the handle member 27, to which lug the spring 39 extends across the interior of the handle member at one side of the cable 31. This spring 39 thus yieldingly holds the trigger arm 36 in retentive engagement with the head or yoke 26. The third arm 40 of the latch member extends outward to be engaged by the finger of the operator for releasing the trigger arm 36 from its retentive engagement just described. Preferably this third arm swings within a guard 41 forming part of the handle member 27.

One side of the arm 40 has a stud 42 which may be engaged by a snap hook 43 on the end of an extension cable 44 that passes into the branch 45 of the handle member 27 through an opening 46 in this branch. This cable 44 is used when an extension body member 47 has its reduced end part 48 tightly inserted inside the branch 45. This extension member 47, shown with intermediate portions omitted for lack of space, may be of any convenient length, as for instance such as to double the effective length of the snare device, when it is necessary to reach to a great height or depth. The extension cable extends throughout the length of the extension member 47 and is fixed in a knob 49 that has a shank slidable in the end part of the extension. This extension member 47 may be fitted in the end of the handle member 27 at 45a, in which case a straight lengthened device is had; whereas the insertion in the branch 45 affords a device of bent shape which may be reached around objects to snare the animal.

The sleeve 28 has a stud 50 extending in through a longitudinal slot 50a in handle member 27, and one end of a tension spring 51 is connected to this stud and has its other end connected to a lug 52 on the inner wall of the intermediate body member 53. This spring yieldingly holds the sleeve 28 in retracted position as indicated by the solid lines in Fig. 4, to be pulled out for drawing the cables to retract the closure members 5 as before described. The exterior surfaces of the intermediate body member 53 and the sleeve 28 preferably are roughened or knurled to afford a firm grip, respectively, for the left and right hand of the operator in the act of pulling on the sleeve 28.

As best seen in Fig. 5, the rod 23 of the auxiliary fork member 19 has a terminal enlargement, one side of which slides against a guide 54 formed on the inner wall of the intermediate member 53, and the other side of which has ratchet teeth 55. The pawl 56 is pivoted at its middle on a pin 57 mounted in the walls of the slot 58 in the wall of the member 53 which is occupied by this pawl 56. One end part of this pawl has retentive engagement with the ratchet teeth 55 of rod 23 and is yieldingly held thereagainst by a flat spring 59 fixed to the inner wall of the member 53 and having its free end part engaged in a slot in the end part of the pawl 56. The other end part of this pawl is in the form of a button 60 to be pressed by the operator for releasing the pawl 56 from the teeth 55. The guide portion 54 of the wall of the member 53 has a longitudinal slot 61, and a knob 62 has a stem 63 slidable in this slot and fixed in the end portion of the rod 23, so that the operator may pull the auxiliary fork member 19 to its inner out-of-use position, during which movement the pawl clicks over the ratchet teeth 55 ready to engage any one of them. Thus the auxiliary fork member 19 may be set at any one of a number of positions more or less restrictive of the enclosure around the body or neck of the animal.

If the extension device 44, 47 is used, the device is cocked by means of a cable 64 connected by a snap hook 65 to an eye 66 on the end of the sleeve 28. This cable passes into the extension member 47 through an opening 67 in the wall thereof close to its junction with the handle member, whether the extension member is fitted in the connection 45 or 45a of the handle member. This cable 64 passes out through an opening in the knob 49 of the cable 44, before described, and has a knob 68.

For use, the device is cocked by the operator pulling out on the sleeve 28, and then the device is directed to bring the fork members 4 astraddle of the animal, whereupon the closure members 5 are released by pulling the trigger 34 and are very quickly and forcibly projected around the animal, completing a noose therearound which is rigid enough to resist efforts of the animal to free itself which would be effective upon a flexible noose. Dogs are known to grab the flexible noose with their mouths and thus escape. The suddenness of action, as well as the rigidity of the closure members in my device defeats such efforts by such animals; and the closed device is effective against struggling, twisting and similar clever movements of the animal, yet does not injure it.

If the extension device 44, 47 is used, the trigger 34 is released by means of cable 44 after having been set by means of cable 64. The auxiliary fork member 19 may be released and set at a desired position prior to extending the device to the animal; the operator being able to judge the size of noose required. But, except when the extension 44, 47 is used, the operator may release the auxiliary fork member by pressing the button 60 after the device has been extended to the animal. If the extension 44, 47 is used, on either part 45 or 45a, the auxiliary fork 19 is set when the device is still unextended and the knob 62 is within reach of the operator.

For use at night, or in dark places, a battery lamp 69 is mounted on the junction member 10 and has conductors 70 and 71 leading within the device to a switch 72 mounted on the intermediate body member 53. For use under water, the lamp 69 may be of waterproof construction.

Modifications may occur in practice, of use as well as construction of the device, and I do not wish to be understood as being limited to the precise construction and uses herein set forth, but having set forth a preferred example of my invention, what I claim as new and desire to secure by Letters Patent is:

1. A noose device comprising a body member by which the device is held, fork members extending from the body member and separated to form an entrance toward the body member, and closure elements movable toward and from each other on the respective fork members for closing and opening said entrance.

2. A device as set forth in claim 1, in which the fork members arcuately curve toward each other and the closure elements are arcuate in conformity with the respective fork members and are arcuately guided by said fork members.

3. A device as set forth in claim 1, including spring means acting to move said closure members to closing position, and releasable means on the body member for retaining said closure members in open position against the action of said spring means.

4. A device as set forth in claim 1, including spring means acting to move said members to closing position, releasable means on the body member for retaining said closure members in opening position against the action of said spring means, said device also including auxiliary means for restricting the space between the fork members, movable relatively to said members and the closure members to effect various degrees of restriction of said space, spring means acting to move said auxiliary means to its most restricting position, and releasable means on the body member for retaining said auxiliary means in one of its less restricting positions.

5. A device as set forth in claim 1, in which the fork members are hollow and in which the closure members are guided within the respective fork members, said device including springs within the respective fork members acting to move said closure members to closing position, cables connected to the respective closure members, said body member being hollow and said cables extending along inside said body member, and means on the body member releasably holding said cables to retain said closure members in opening position against the action of said springs.

6. A noose device comprising a body member, noose forming means at one end of said member, means near the opposite end of the member for operating the noose forming means, an operative connection from said operating means to said noose forming means, and extension means comprising an extension attached to said body member and an operative connection extending from said operating means along said extension, whereby the operating means may be operated from a remote part of said extension means.

7. A noose device comprising a body member by which the device is held, and noose-forming members disposed on said body member to form an entrance toward the body member, certain of said noose-forming members being fixed on said body member and certain others of said noose-forming members being substantially inflexibly guided by the fixed members into and out of noose-forming position, and means on the body member for moving said noose-forming members into and out of said position.

8. A noose device comprising a body member by which the device is held, main noose-forming means at one end of said body member, means at said end for varying the effective size of the noose formed by the device, means on the body member for operating the noose-forming means, and means on said body member for operating said varying means.

9. A noose device comprising a hollow body member and hollow fork members branching from one end of said body member, closure members guided in the respective fork members for movement into and out of closing position, connecting means connected to the respective closure members and extending within said body member, and retaining means in retentive relation to said connecting means within the body member and extending outside said body member for manipulation to release said connecting means, said device comprising means to move the closure members toward closing position when said connecting means is released.

10. A device as set forth in claim 9, including an auxiliary fork member movable between the hollow fork members to more or less restrict the space therebetween, connecting means connected to said auxiliary fork member and extending within said body member, and retaining means in retentive relation to this last said connecting means within the body member and extending outside said body member for manipulation to release said connecting means, said device also comprising means to move said auxiliary member to a more restricting position when said connecting means is released.

11. A noose device comprising a body member, noose-forming members movable toward and away from each other at one end of said body member, means on the body member for affecting the movement of the noose forming members, an extension for increasing the effective reach of the body member, and an operative connection on said extension, connected to the movement-effecting means for operating said means from a point remote therefrom along said extension.

12. A noose device comprising a body member, fork members branching from said body member, each in the form of a circular arc, closure members of like arcuate formation slidable along the fork members in the direction of the arcuate extension of the fork members and closure members, and means on the body for effecting movement of the closure members.

13. A noose device comprising a hollow body member, movable noose-forming means at one end of said member, handle means near the opposite end of said member, and an operative connection extending from the noose-forming means along the interior of the body member to said handle means, whereby movement of the noose-forming means is effected from a position near said handle means.

14. A device as set forth in claim 13, in which the operative connection includes a pair of cables, yoke means connected to the cables within the handle means, and controlling means engaging the yoke and extending outside said handle means for manipulation.

15. A noose device comprising a body member by which the device is held, fork members extending from the body member and separated to form an entrance toward the body member, means adapted to be manipulated for closing and opening said entrance, and auxiliary means for restricting the space between the fork members, movable relatively to said members to effect various degrees of restriction of said space.

16. A device as set forth in claim 15, including spring means acting to move the auxiliary means to its most restricting position, and releasable means on the body member for retaining said auxiliary means in one of its less restricting positions.

17. A device as set forth in claim 15, in which the body member is hollow, the auxiliary means comprising a fork extending between the fork members of the body member, and a rod connected to said fork of said auxiliary means and extending along inside the body member, and means on the body member releasably holding said rod to retain said fork of said auxiliary means in one of its less restricting positions.

18. A noose device comprising a body member by which the device is held, fork members extending from the body member and separated to form an entrance toward the body member, means adapted to be manipulated for closing and opening said entrance, and a sleeve slidably connected to the body member and connected to the closing and opening means, to move the latter mentioned means to open position when slid by the operator relatively to the body member.

19. A noose device comprising a body member by which the device is held, fork members extending from the body member and separated to form an entrance toward the body member, an extension attached to the body member, means connected to the closing and opening means and mounted on the body member for manipulation to set said closing and opening means to open position, and means associated with said extension and connected to the means that is connected to the closing and opening means, for setting said means from a remote part of said extension, means for releasably holding the closing and opening means in open position and mounted on said body member, and means associated with said extension and connected to said releasably-holding means for operating said releasably-holding means from a remote part of said extension.

20. A device as set forth in claim 19, in which the body member is forked, having two members to either one of which the extension may be attached, the members extending divergently from the body member, so that the device is given different effective shapes by transfer of the extension from either body-fork member to the other.

HARRY O. PORTER.